(12) United States Patent
Peng et al.

(10) Patent No.: US 11,473,758 B1
(45) Date of Patent: Oct. 18, 2022

(54) LIGHTING DEVICE

(71) Applicant: APUTURE IMAGING INDUSTRIES CO., LTD., Guangdong (CN)

(72) Inventors: Daoyou Peng, Guangdong (CN); Binbin Zhou, Guangdong (CN); Yongquan Lin, Guangdong (CN)

(73) Assignee: APUTURE IMAGING INDUSTRIES CO., LTD., Guangdong (CN)

( * ) Notice: Subject to any disclaimer, the term of this patent is extended or adjusted under 35 U.S.C. 154(b) by 0 days.

(21) Appl. No.: 17/551,215

(22) Filed: Dec. 15, 2021

(30) Foreign Application Priority Data

Jun. 11, 2021 (CN) .......................... 202110654562.8

(51) Int. Cl.
*F21V 17/16* (2006.01)
*F21V 29/70* (2015.01)
*F21W 131/406* (2006.01)

(52) U.S. Cl.
CPC ............. *F21V 17/164* (2013.01); *F21V 29/70* (2015.01); *F21W 2131/406* (2013.01)

(58) Field of Classification Search
CPC .. F21V 17/164; F21V 29/70; F21W 2131/406
See application file for complete search history.

(56) References Cited

U.S. PATENT DOCUMENTS

| | | | | |
|---|---|---|---|---|
| 5,353,211 A | * | 10/1994 | Merko | F21S 8/00 362/372 |
| 10,113,735 B2 | * | 10/2018 | Emerson | F21V 17/002 |
| 10,900,649 B1 | * | 1/2021 | Todd | F21V 21/30 |
| 11,175,029 B1 | * | 11/2021 | Zhang | F21L 4/00 |

FOREIGN PATENT DOCUMENTS

| | | |
|---|---|---|
| CN | 202472197 U | 10/2012 |
| CN | 109991796 A | 7/2019 |
| CN | 212515302 U | 2/2021 |

OTHER PUBLICATIONS

The First Office Action and Search Report dated Aug. 24, 2021, for Aputure Imaging Industries Co., Ltd., from China Application No. 202110654562.8. and Its translation (6 Pages).
The Second Office Action and Search Report dated Sep. 24, 2021, for Aputure Imaging Industries Co., Ltd., from China Application No. 202110654562.8. and Its translation (8 Pages).

\* cited by examiner

*Primary Examiner* — Anabel Ton
(74) *Attorney, Agent, or Firm* — Mark M. Friedman (57) ABSTRACT

A lighting device is provided and includes: a lamp main housing including a containing cavity, wherein a recess in communication with the containing cavity and a snap-fit structure configured to connect an optical accessory are disposed at an end of the lamp main housing, and a position of the recess corresponds to a position of the snap-fit structure; a heat dissipation device disposed in the containing cavity; a light source in heat-conduction connection with the heat dissipation device, and located inside of the containing cavity or the recess; a front-end housing including a throughout hollow cavity, wherein an end of the front-end housing is disposed on the light source, and another end of the front-end housing faces an outer side of the recess and passes through the recess; wherein light emitted by the light source passes through the hollow cavity of the front-end housing and is emitted outward.

8 Claims, 7 Drawing Sheets

LIGHTING DEVICE

FIELD OF INVENTION

The present disclosure generally relates to the technical field of lighting, and in particular to a lighting device.

BACKGROUND OF INVENTION

In scenes of videos, films, television dramas, photographs and the like, it is often necessary to use additional lighting device to supplement light or illuminate objects or scenes being photographed. The lighting device generally includes a housing and a light source disposed in the housing. The lighting device maybe a LED, etc. According to different scenes, performance requirements for the lighting device are also different. In some scenes, it is often required that light output power of the lighting device is large enough to output light with great light intensity, and the output light possess multiple colors and multiple color temperatures. Moreover, the requirements of illuminance and uniformity should also be met. However, large power means that heat generated by the light source becomes larger, while the multiple colors, the multiple color temperatures, the illuminance and the uniformity have strictly requirement for the light source.

A light emitting surface of the light source disposed on a substrate is divergent, so that most of the existing lighting devices (e.g. patents CN208224691U, CN211853588U) are equipped with a Baorong snap-fit female base, and optical accessories (e.g. soft light box, standard cover, etc.) including a Baorong snap-fit male base are detachably connected to the female base, so as to form an expected light output effect. Due to the above Baorong snap-fit design, a part of transfer section exists, and light emitted from the light source cannot be reflected or refracted in this section. Therefore, in order to improve the reflection of the light source, it is required to dispose the light source to protrude from the housing, to ensure that after the accessory including the Baorong snap-fit male base is installed, the light emitted from the light source can reach a reflection section or a refraction section of the accessory effectively.

SUMMARY OF INVENTION

A technical problem to be solved by the present disclosure is providing a lighting device solving the technical problem that a light source of an existing lighting device including a Baorong snap-fit base protrudes from a housing (that is, being located outside of the housing).

In order to solve the technical problem above, the present disclosure provides a lighting device including: a lamp main housing including a containing cavity, wherein a recess in communication with the containing cavity and a snap-fit structure configured to connect an optical accessory are disposed at an end of the lamp main housing, and a position of the recess corresponds to a position of the snap-fit structure; a heat dissipation device, wherein the heat dissipation device is disposed in the containing cavity; a light source, wherein the light source is in heat-conduction connection with the heat dissipation device, and is located inside of the containing cavity or the recess; and a front-end housing including a throughout hollow cavity, wherein an end of the front-end housing is disposed on the light source, and another end of the front-end housing faces an outer side of the recess and passes through the recess; wherein, light emitted by the light source passes through the hollow cavity of the front-end housing and is emitted outward.

The lighting device provided by the present disclosure in which the position of the light source is retracted inside of the containing cavity or the recess of the lamp main housing, and the end of the front-end housing away from the light source faces an outer side of the recess and passes through the recess, so that an outer end surface of the front-end housing protrudes from the outer end surface of the recess. The light emitted by the light source is transmitted to the outside of the recess through the front-end housing, and the light of the light source can effectively reach the optical accessory connected with the snap-fit structure, to generate a desired light output effect, and effectively reduce light loss. At the same time, since the light source is located inside of the containing cavity or the recess, heat conduction distance between the light source and a main heat dissipation area of the heat dissipation device can be reduced effectively, and heat conduction efficiency can be improved effectively.

Furthermore, the lighting device further includes an optical sheet, the optical sheet is disposed at an end of the front-end housing away from the light source, and there is a preset distance between the optical sheet and the light source.

Furthermore, a reflection layer is disposed on an inner wall of the front-end housing.

Furthermore, a cross-section of the inner wall of the front-end housing is polygonal, and the reflection layer includes a plurality of reflection planes attached to the inner wall of the front-end housing.

Furthermore, the reflection layer includes any one of a frosted reflection surface, a faceted reflection surface and a threaded reflection surface.

Furthermore, the reflection layer is formed integrally with the front-end housing.

Furthermore, a light mixing member is disposed on the inner wall of the front-end housing, and the reflection layer is disposed on the light mixing member.

Furthermore, the front-end housing is in heat-conduction connection with the lamp main housing, or the front-end housing is in heat-conduction connection with the heat dissipation device.

Furthermore, a fan is disposed on the front-end housing or the lamp main housing, the fan blows air to dissipate heat for the front-end housing.

Furthermore, an insulating base is disposed between the light source and the front-end housing, and the insulating base insulates and separates the light source from the front-end housing.

Compared with the prior art, the present disclosure has beneficial effects as follows:

The present disclosure provides a lighting device in which the position of the light source is retracted inside of the containing cavity or the recess of the lamp main housing, and the end of the front-end housing away from the light source faces an outer side of the recess and passes through the recess, so that the outer end surface of the front-end housing protrudes from the outer end surface of the recess. The light emitted by the light source is transmitted to the outer side of the recess through the front-end housing, and the light of the light source can effectively reach the optical accessory connected with the snap-fit structure, to generate a desired light output effect, and to reduce a light loss effectively. At the same time, since the light source is located inside of the containing cavity or the recess, heat conduction distance between the light source and the main heat dissipation area of the heat dissipation device can be reduced effectively, and the heat conduction efficiency can be improved effectively. Other beneficial effects of the present disclosure are exhibited in the specific embodiments.

Wherein, the meanings of figure labels are as follows:

1, lamp main housing; 11, containing cavity; 12, recess; 13, snap-fit structure; 14, heat dissipation hole; 101, upper housing; 102, lower housing; 103, front housing; 104, rear housing; 2, heat dissipation device; 21, heat dissipation base; 22 heat pipe; 23, fin; 24, fixing plate; 25, main fan; 3, light source; 4, front-end housing; 41, reflection layer; 42, light mixing member; 421, connecting foot; 43, connecting part; 5, optical sheet; 6, insulating base; 7, auxiliary fan; 8, circuit board.

DETAILED DESCRIPTION OF PREFERRED EMBODIMENTS

In order to make those skilled in the art better understand the solution of the present disclosure, technical solutions in embodiments of the present disclosure will be described clearly and completely in combination with the drawings in the embodiments of the present disclosure. Obviously, the embodiments described are only part of the embodiments of the present disclosure, not all embodiments. According to the embodiments in the present disclosure, all other embodiments obtained by those of skill in the art without making creative work belong to the protection scope of the present disclosure.

Herein, the reference to "embodiment" means specific features, structures or characteristics described in combination with the embodiment can be included in at least one embodiment of the present disclosure. The phrase appearing at each position of the specification does not necessarily refer to the same embodiment, neither is an independent or alternative embodiment mutually exclusive with other embodiments. Those skilled in the art understand explicitly and implicitly that the embodiments described herein can be combined with other embodiments.

In descriptions of the present disclosure, it should be understood that, azimuth or positional relationships represented by terms up, down, front, back, left, right, vertical, horizontal, top, bottom, inside, outside, etc., are azimuth or positional relationships based on the drawings, and are merely for the convenience of describing the present disclosure and simplifying the description, instead of indicating or implying that the device or the element referred must have a specific orientation, be constructed and operated in a specific orientation, thus should not be interpreted as a limitation of the present disclosure.

Unless there is other definition, all technical and scientific terms used herein have the same meanings with those commonly understood meanings understood by those skilled in the technical field of the present disclosure. The terms used in the specification of the present disclosure are only for the purpose of describing specific embodiments, and are not intended to limit the present disclosure.

Referring to FIG. 1 to FIG. 7, the present disclosure provides a lighting device, the lighting device includes a lamp main housing 1, a heat dissipation device 2, a light source 3 and a front-end housing 4.

The lamp main housing 1 includes a containing cavity 11. The heat dissipation device 2 is disposed in the containing cavity 11, to use the containing cavity 11 to protect the heat dissipation device 2. A recess 12 in communication with the containing cavity 11 and a snap-fit structure 13 configured to connect an optical accessory (e.g. soft light box, standard cover, etc.) are disposed at an end of the lamp main housing 1, and a position of the recess 12 corresponds to a position of the snap-fit structure 13. It is understandable that a plurality of snap-fit structures 13 may be disposed on an outer edge of the recess 12. The recess 12 herein may be circular, so that the plurality of snap-fit structures 13 may be disposed along a circumferential direction of the recess 12, so that the connected optical accessory can correspond to the position of the recess 12 (such as the optical accessory covers the recess 12, or the optical accessory located above the recess 12).

The light source 3 is in heat-conduction connection with the heat dissipation device 2, and is located inside of the containing cavity 11 or the recess 12. It is understandable that the light source 3 is not prominent higher than an end of the containing cavity 11, and is not prominent higher than an end of the recess 12. The light source 3 may be lower than the end of the containing cavity 11 or lower than the end of the recess 12. The end herein can be understood as an outer surface that the optical accessory can contact. In this way, a space of the lamp main housing 1 is fully utilized, a heat conduction distance between the light source 3 and a main heat dissipation of the heat dissipation device 2 is shortened, so as to improve the heat conduction efficiency.

The front-end housing 4 includes a throughout hollow cavity, wherein, an end of the front-end housing 4 is disposed on the light source 3, and the other end of the front-end housing 4 faces an outer side of the recess 12 and passes through the recess 12, light emitted by the light source 3 passes through the hollow cavity of the front-end housing 4 and is emitted outward. After the optical accessory is connected to the snap-fit structure 13, a front end of the front-end housing 4 (that is, an end of the front-end housing 4 away from the light source 3) can be inserted inside the optical accessory. The light emitted by the light source 3 passes through the hollow cavity of the front-end housing 4 and is emitted outward through the front end of the front-end housing 4. After passing through the restrain of the front-end housing 4, the light can reach the reflection section or the refraction section of the optical accessory effectively, to generate a desired light output effect, and reduce the light loss effectively.

According to the solution above, in the lighting device which can connect the optical accessory through the snap-fit structure 13, it is not required for the light source 3 to protrude from the lamp main housing 1. While making full use of a space of the lamp main housing 1 and improving the heat conduction efficiency between the heat dissipation device 2 and the light source 3, the expected light output effect is achieved and the light loss is lowered, thus improving the overall performance and use experience of the lighting device, and having high popularization and application value.

Figure 1:
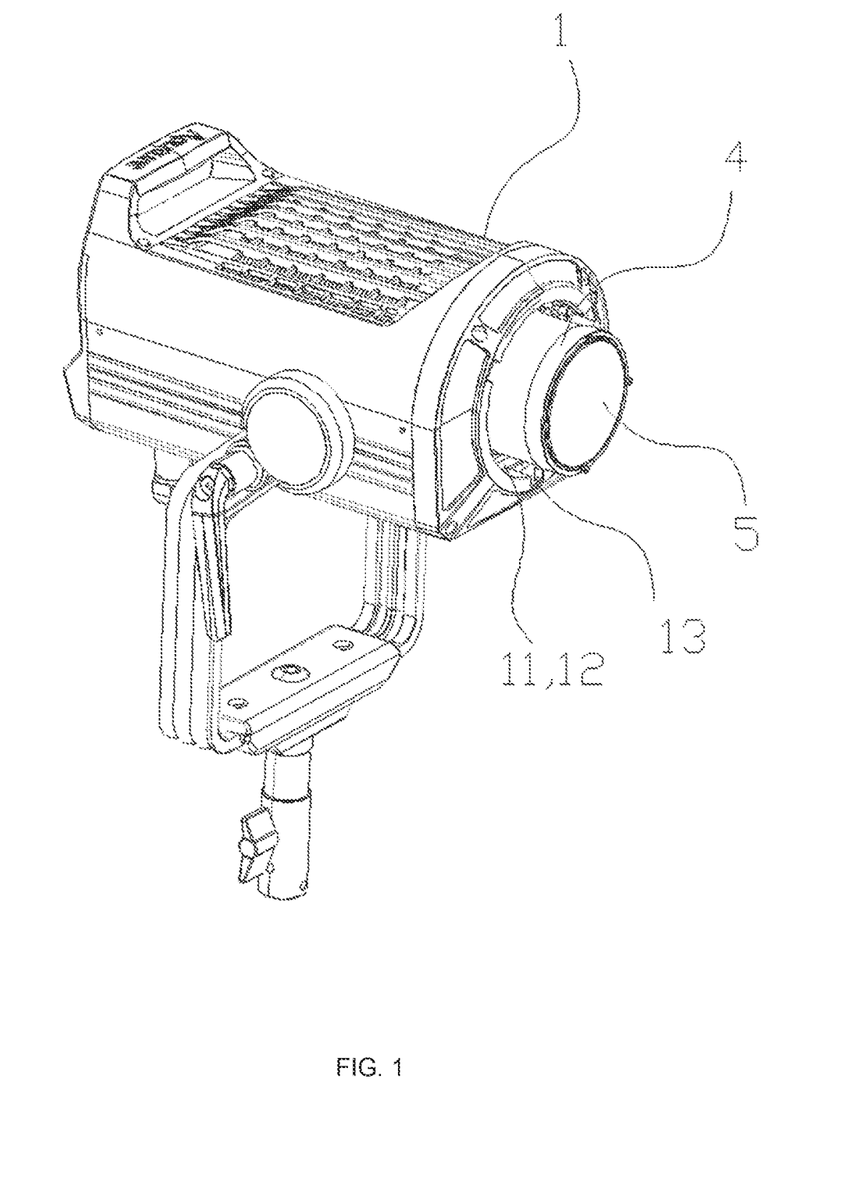
FIG. 1 is a structural schematic diagram provided by an embodiment of the present disclosure.
Figure 2:
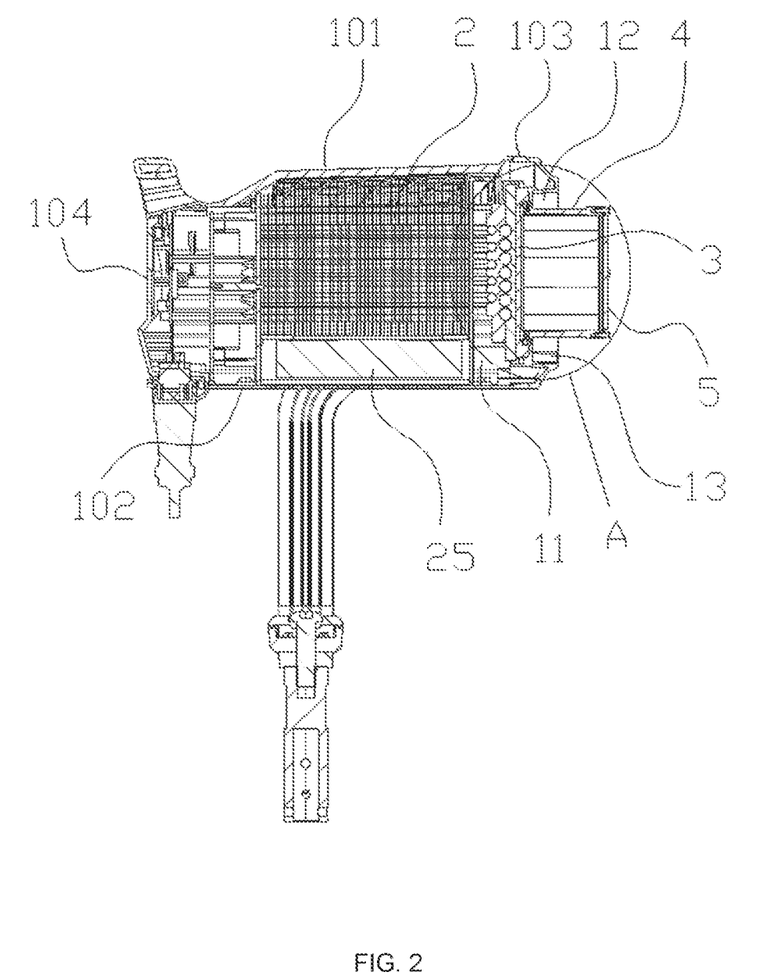
FIG. 2 is a cross-sectional schematic diagram provided by an embodiment of the present disclosure.

It should be noted that the outer side of the recess 12 refers to a side of the recess 12 facing away from the containing cavity 11, that is, the right side shown in FIG. 2.

Moreover, in order to facilitate understanding of the present disclosure, referring to FIG. 2, orientation definitions are made as follows: the right side of the FIG. 2 is front, the left side of the FIG. 2 is back, the upper side of the FIG. 2 is up, the lower side of the FIG. 2 is down.

Referring to FIG. 1 to FIG. 4, in this embodiment, the snap-fit structure 13 includes a plurality of snap-fit female bases circumferentially disposed around the recess 12. The snap-fit female base can be used for detachable connecting a snap-fit male base of an optical accessory. For example, the snap-fit female base and the snap-fit male base may be a Baorong snap-fit female base and a Baorong snap-fit male base. Admittedly, in other preferred embodiments, the snap-fit structure 13 may also include a plurality of Baorong snap-fit male bases circumferentially disposed around the recess 12, or the snap-fit structure 13 may also be an existing structure which can be detachably connected with the optical accessory. The present disclosure does not limit the specific structure of the snap-fit structure 13.

Specifically, the lamp main housing 1 includes an upper housing 101, a lower housing 102, a front housing 103 and a rear housing 104. The upper housing 101, the lower housing 102, the front housing 103 and the rear housing 104 are crisscross occlusal connected with each other to form the above containing cavity 11. Wherein, the upper housing 101, the lower housing 102, the front housing 103 and the rear housing 104 may be made of metal or metal alloy, etc. The recess 12 and the snap-fit structure 13 are disposed on the front housing 103, the light source 3 is disposed inside of the recess 12 and disposed at an front end of the containing cavity 11, a circuit board 8 may be disposed on a rear end of the containing cavity 11, and the circuit board 8 may be electrically connected to the light source 3 and drives and controls the light source 3 to emit light. The heat dissipation device 2 is disposed between the light source 3 and circuit board 8. Both of the upper housing 101 and the lower housing 102 are provided with heat dissipation hole 14, a position of the heat dissipation hole 14 and a position of the main heat dissipation area of the heat dissipation device 2 are corresponding.

Certainly, the lamp main housing 1 may also be composed of two housing parts, or three housing parts, or more than four housing parts, and the housing parts are connected through crisscross occlusal connection with each other, so that a sealing effect of the connection is improved, which can reduce invasion of water and other liquids effectively.

Figure 3:
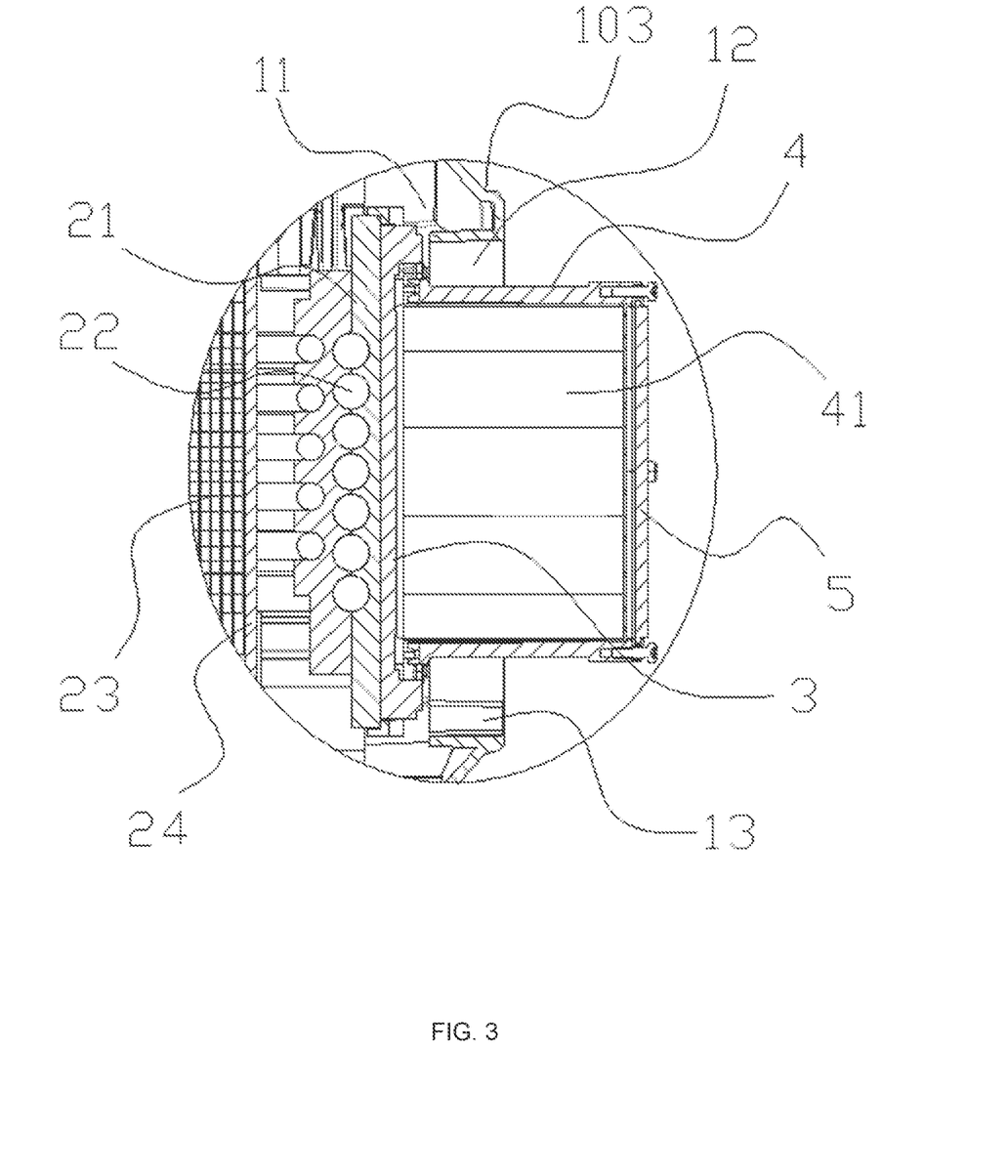
FIG. 3 is a partial enlarged schematic diagram of part A of FIG. 2.
Figure 4:
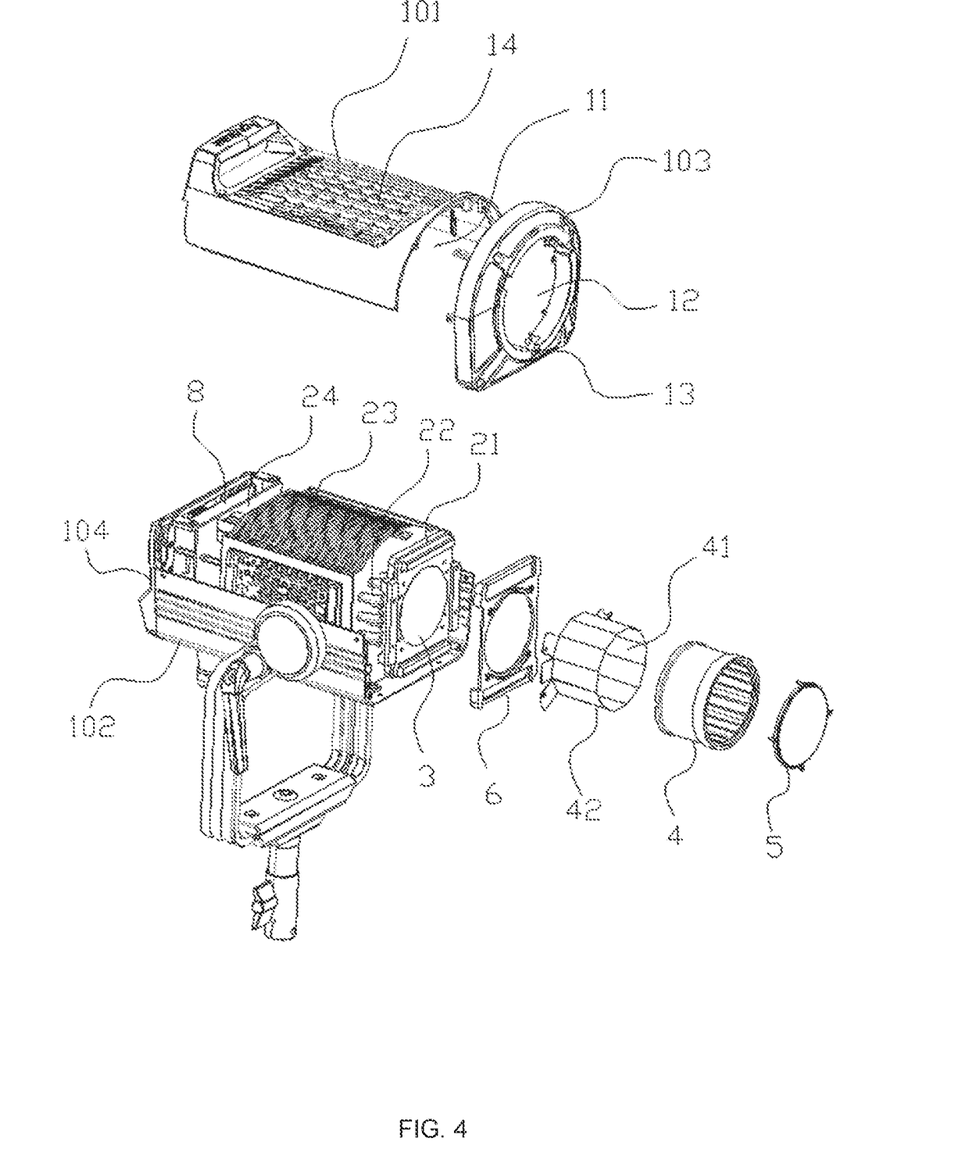
FIG. 4 is an explosion structure schematic diagram provided by an embodiment of the present disclosure.

Referring to FIG. 2 to FIG. 4, in this embodiment, the heat dissipation device 2 includes a heat dissipation base 21, a plurality of heat pipes 22, a plurality of fins 23, a fixing plate 24, and a main fan 25. The light source 3 is disposed at an end of the heat dissipation base 21 and is in heat-condition connection with the heat dissipation base 21, the other end of the heat dissipation base 21 is in heat-condition connection with a plurality of parallel spaced heat pipes 22. A plurality of parallel spaced fins 23 are separated and disposed threading through the plurality of heat pipes 22. The plurality of fins 23 form the main heat dissipation area of the heat dissipation device 2. Fixing plates 24 are respectively disposed on two opposite ends of the main heat dissipation area, wherein one fixing plate 24 is configured to separate the plurality of fins 23 and the heat dissipation base 21, the other fixing plate 24 is configured to separate the plurality of fins 23 and the circuit board 8. Positions of the plurality of fins 23 correspond to a position of the heat dissipation hole 14 for separating a circulation channel of the circuit board 8, the light source 3 and the heat dissipation hole 14. When a liquid, such as water, enters through one heat dissipation hole 14, the liquid cannot enter the circuit board 8 or the light source 3, or can be discharged through another relatively arranged heat dissipation hole 14, for realizing waterproof function of the whole machine. The main fan 25 is disposed between the plurality of fins 23 and the lower housing 102, and heat on the plurality of fins 23 can be discharged by the main fans 25.

In some embodiments, a side of each of the plurality of fins 23 facing the upper housing 101 is an arc projecting outward. It is understandable that the a cross-sectional of each of the plurality of fins 23 facing the upper housing 101 may be a raised arc surface or a cure surface, rather than a square surface. Therefore, the plurality of fins 23 have a large heat dissipation area, which is conductive to the dissipation of the heat.

As the light source 3 is disposed in the containing cavity 11 or the recess 12, a distance between the light source 3 and the main heat dissipation area (that is, a distance between the light source 3 and a closest fin 23) can be shortened effectively, so as to improve the heat conduction efficiency.

Due to the method above has high heat dissipation efficiency, the light source 3 may be configured to be more power light sources, or a high power light source. Certainly, the heat dissipation of the whole machine may also be in other methods. For example, the position of the main fan 25 may be changed, or the number of the main fan 25 may be two or more, and air blowing may be upward and downward, or forward and back, or left and right, etc. Certainly, other heat dissipation methods, such as water cooling heat dissipation and oil cooling heat dissipation, are also feasible.

In this embodiment, the light source 3 may be a COB light source, or a monochrome light source, a two-color light source or a multi-color light source, such as an LED array composed of a monochrome white light, a two-color light of cold white and warm white, or a multi-color of any combination of a RGB, a warm white, a cold white, an amber, a lemon, etc. The arrays above are combined into an area light source. Certainly, other packaging forms (csp, etc.) or colors (yellow, lemon, amber, purple, etc.) light source (e.g. organic light emitting diode, or laser diode, or quantum dot light emitting diode arrays, etc.) are also feasible. A substrate of the light source 3 is thermally connected to the heat dissipation base 21, an opposite side of the substrate of the light source 3 is disposed with a wiring part, so that a driving current can be pulled in.

Figure 5:
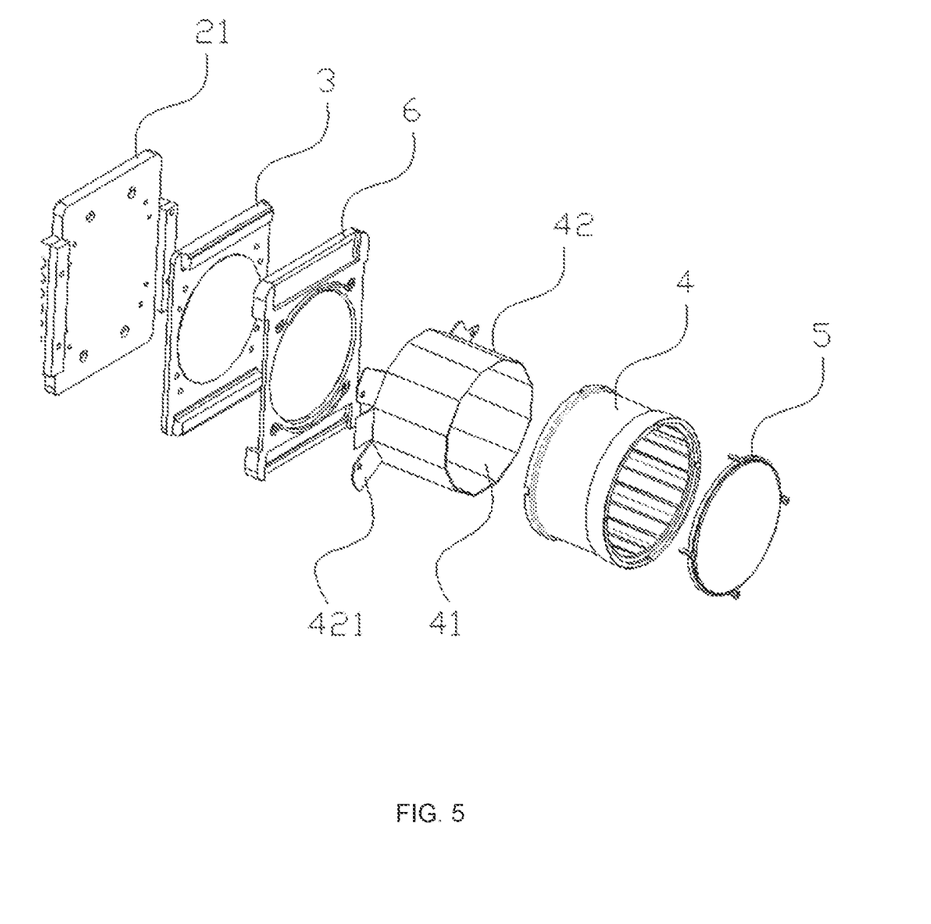
FIG. 5 is an explosion structure among a heat dissipation base, a light source, a front-end housing and an optical sheet provided by an embodiment of the present disclosure.

Referring to FIG. 4 and FIG. 5, in order to avoid the front-end housing 4 affecting a circuit disposed on the substrate of the light source 3, an insulating base 6 is disposed between the light source 3 and the front-end housing 4. The insulating base 6 can insulate and separate the light source 3 from the front-end housing 4, to avoid the light source 3 being effected effectively.

Referring to FIG. 2 to FIG. 5, in this embodiment, the lighting device further includes an optical sheet 5. The optical sheet 5 is disposed at an end of the front-end housing 4 away from the light source 3, and there is a preset distance between the optical sheet 5 and the light source 3. Thereby, light emitted by the light source 3 is transmitted through the preset distance firstly, and then reaches the optical sheet 5, which can reduce the light output loss effectively.

Specifically, the optical sheet 5 can be fixed at the end of the front-end housing 4 by way of gluing, clamping, screw, etc. Preferably, the optical sheet 5 may be any one of a plane frosting, a compound eye array, a Fresnel, a convex lens, etc. The optical sheet 5 may be made of glass or plastic. The specific selection of the optical sheet 5 can be adjusted according to application needs, the present disclosure does not limit the optical sheet 5. The optical sheet 5 covers the hollow cavity of the front-end housing 4 in a sealed manner. The optical sheet 5 can separate the hollow cavity of the front-end housing 4 from an external environment, and thus play a role of waterproof and dustproof. Certainly, in order to prevent water and dust effectively, a rubber ring can also be disposed between the optical sheet 5 and the front-end housing 4. The optical sheet 5 can receive mixed light emitted from the hollow cavity of the front-end housing 4, and transmit the light along its own thickness direction.

In this embodiment, there may be a plurality of solutions for the front-end housing 4:

First, an inner wall of the front-end housing 4 may not be treated, at this time, the hollow cavity of the front-end housing 4 plays a role of providing an optical path, and can guide the light to the optical sheet 5 to emit outward;

Second, the inner wall of the front-end housing 4 is provided with a reflection layer 41 which is configured to mix light, at this time, the front-end housing 4 plays a role of mixing light, which can reduce the light loss effectively. While the light source 3 is multi-colors, good light mixing can be realized, and uniformity of light output may be improved.

Wherein, a shape of the front-end housing 4 may be cylindrical, prismatic, etc., which is not limited herein.

Figure 6:
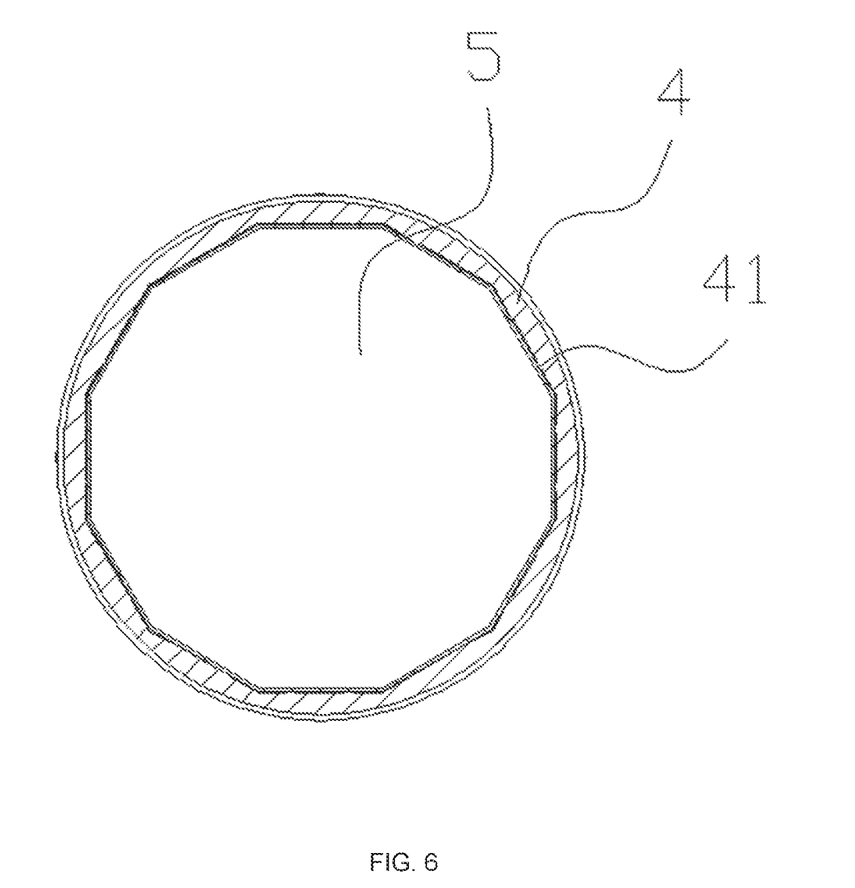
FIG. 6 is a cross-sectional schematic diagram of a front-end housing provided by an embodiment of the present disclosure.

Referring to FIG. 6, in the second solution above, a cross-section of the inner wall of the front-end housing 4 is polygonal. The reflection layer 41 includes a plurality of reflection planes attached to the inner wall of the front-end housing 4 (that is, the inner wall of the front-end housing 4 may be n-prism type, the n represents the number of cross-section planes parallel to the plane, for example, the cross-section may be octagonal, decagonal, dodecagonal, etc., that is, the larger the n is, the more reflective surfaces can be provided, and the better effect of the light mixing). In other preferred embodiments, the reflection layer 41 may also be other surface structures with light mixing effect. For example, the reflection layer 41 may also include any one of a smooth specular reflection surface, a frosted reflection surface, a faceted reflection surface and a threaded reflection surface.

Preferably, referring to FIG. 6, in the two solutions above, the reflection layer 41 can be formed integrally with the front-end housing 4. That is, the reflection layer 41 can be formed by directly treat on the inner wall of the front-end housing 4. For example, a reflective material (such as silver) is plated on the inner wall of the front end housing 4 firstly, and then an oxidation protective layer (such as titanium dioxide, etc.) is plated on the reflective material, thus to form the reflection layer 41.

Certainly, referring to FIG. 4 and FIG. 5, in the two solutions above, a light mixing member 42 may be disposed on the inner wall of the front-end housing 4, the reflection layer 41 is disposed on the light mixing member 42. During specific production, the light mixing member 42 with the reflection layer 41 may be formed firstly, and then the light mixing member 42 is embedded into the inner wall of the front-end housing 4, thus to form the front-end housing 4 with the reflection layer 41.

In the lighting device of the present disclosure, in order to transmit the heat of the front-end housing 4 outward, the present embodiment provides varied solutions as follows:

Third, the front-end housing 4 is in heat-conduction connection with the lamp main housing 1, to dissipate the heat generated by the front-end housing 4 out through the lamp main housing 1. Because both of the lamp main housing 1 and the front-end housing 4 are exposed, so heat can be dissipated through air directly. Specifically, referring to FIG. 7, a connecting part 43 is disposed on an outer wall of the front-end housing 4. The connecting part 43 may be in heat conduction connection with an inner wall of the front housing 103 of the lamp main housing 1 through a heat conduction plate or a heat conduction silicone grease. Certainly, in this solution, the front-end housing 4 may have no reflection layer 41, or the front-end housing 4 is integrally formed with the reflection layer 41, or the reflection layer 41 is indirectly disposed on the front-end housing 4 through the light mixing member 42. An internal structure of the front-end housing 4 is not limited, as long as the heat-conduction connection between the front-end housing 4 and the front housing 103 can be realized.

Fourth, the front-end housing 4 is in heat-conduction connection with the heat dissipation device 2, to transmit the heat generated by the front-end housing 4 to the heat dissipation device 2, and dissipate the heat outward. Specifically, when the front-end housing 4 has no reflection layer 41 or the front-end housing 4 is integrally formed with the reflection layer 41, a plurality of connecting blocks or crimps are circumferentially disposed at an end of the front-end housing 4 closed to the light source 3. The plurality of connecting blocks or crimps may be in heat-conduction connection with the heat dissipation base 21, so as to transmit the heat generated by the front-end housing 4 to the heat dissipation base 21, and dissipate the heat outward. As is shown in FIG. 5, when the reflection layer 41 is disposed on the light mixing member 42, a plurality of connecting feet 421 are circumferentially disposed at the end of the light mixing member 42 closed to the light source 3. The plurality of connecting feet 421 may be in heat-conduction connection with the heat dissipation base 21, so as to transmit the heat generated by the front-end housing 4 to the heat dissipation device 2 and dissipate the heat outward.

Figure 7:
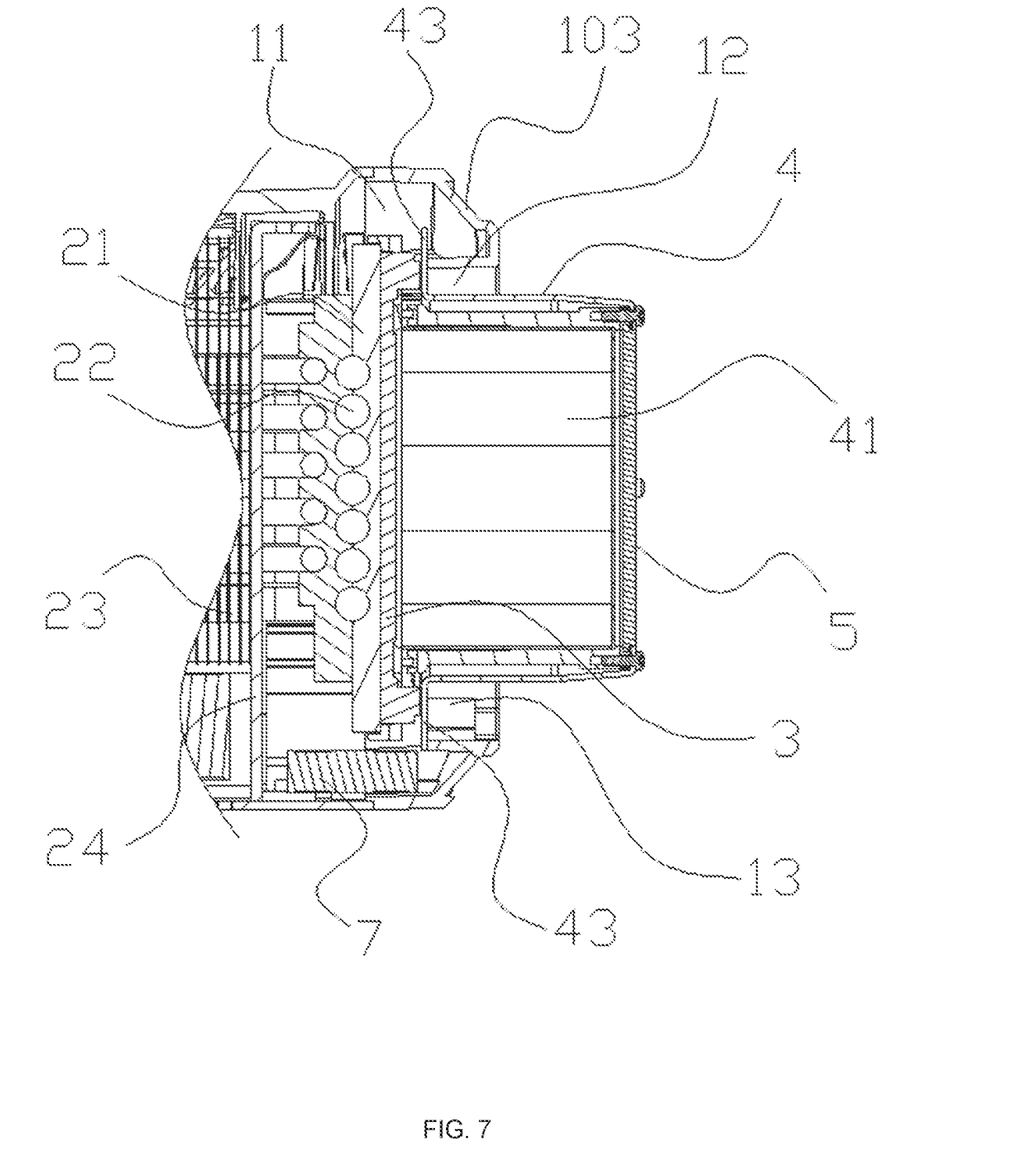
FIG. 7 is a structural schematic diagram of a front-end housing connected with a lamp main housing provided by an embodiment of the present disclosure.

Fifth, an auxiliary fan 7 is disposed on the front-end housing 4 or the lamp main housing 1, and the auxiliary fan 7 blows air to dissipate heat for the front-end housing 4. It is understandable that, the auxiliary fan 7 may be a small silent fan. Referring to FIG. 7, specifically, the auxiliary fan 7 is disposed on the front housing 103 and is located on the peripheral side of the front-end housing 4, and the auxiliary fan 7 blows air to dissipate heat for the periphery of front-end housing 4. For example, an air inlet and an air outlet opposite with each other may be disposed on the front housing 103, the auxiliary fan 7 aspirates air from the air inlet, the air passes through the front-end housing 4, and then discharges the heat generated by the front-end housing 4 through the air outlet. In some embodiments, the air inlet is disposed at a position of the auxiliary fan 7 corresponding to the front housing 103, the auxiliary fan 7 aspirates air from the air inlet, the air passes through the front-end housing 4, and discharges the heat generated by the front-end housing 4 through the recess 12. In other embodiments, the auxiliary fan 7 is disposed on the peripheral side of the front-end housing 4, a vent in communication with the hollow cavity of the front-end housing 4 is disposed at a position of a side wall of the front-end housing 4 corresponding to the auxiliary fan 7, and the auxiliary fan 7 can blow air to dissipate heat for the hollow cavity of the front-end housing 4 directly.

Sixth, certainly, the front-end housing 4 may be in heat-conduction connection with the substrate of the light source 3 (not shown in the figures), so as to transmit the heat generated by the front-end housing 4 to the substrate of the light source 3, and then transmit the heat to heat dissipation base 21 through the substrate of the light source 3, and dissipate the heat outward. Specifically, the periphery of the front-end housing 4 is provided with a circumferential protrusion disposed along a direction perpendicular to the axial of the front-end housing 4. The front-end housing 4 is fixed on a part of the substrate of the light source 3 without LED through fasteners, such as screw, and the circumferential protrusion is away from a light emitting part of the light source 3. When the front-end housing 4 is integrally formed with the reflection layer 41, the inner wall of the front-end housing 4 may be coated with reflection layer 41 such as silver. In other embodiments, the reflective layer 41 is composed of a separate light mixing member 42. For example, the light mixing member 42 may be made of a mirror aluminum or other metal material with high reflectivity, and then fixed to an interior of the front-end housing 4 by means of adhesive or the like. Heat generated by the light mixing member 42 may be transmitted from the front-end housing 4 to the substrate of the light source 3 and then conducted by the heat dissipation base 21. The solution above is conducive to the installation of various components, and the heat dissipation efficiency is high.

In the heat dissipation solutions above, may be used separately, or may be any or multiple combinations, such as a combination of solution third and solution fifth, or a combination of solution fourth and solution fifth, as long as those skilled in the art can transmit the heat of the front-end housing 4 out according to the solutions given above.

In summary, the lighting device provided by the present disclosure in which the position of the light source 3 is retracted inside of the containing cavity 11 or the recess 12 of the lamp main housing 1, and the end of the front-end housing 4 away from the light source 3 faces the outer side of the recess 12 and passes through the recess 12, so that the outer end surface of the front-end housing 4 protrudes from the outer end surface of the recess 12. The light emitted by the light source 3 is transmitted to the outside of the recess 12 through the front-end housing 4, and the light of the light source 3 can effectively reach the optical accessory connected with the snap-fit structure 13, it is possible to satisfy the installation of the optical accessory without protruding set of the light source 3, to generate the desired light output effect, and reduce the light loss effectively. Meanwhile, since the light source 3 is located inside of the containing cavity 11 or the recess 12, heat conduction distance between the light source 3 and the main heat dissipation area of the heat dissipation device 2 can be reduced effectively, and the heat conduction efficiency can be improved effectively. The light emitted by the light source 3 is transmitted through the preset distance and then reaches the optical sheet 5, which can reduce the light output loss effectively. The reflection layer 41 can make the front end housing 4 play a role of light mixing cavity, which can reduce the light loss effectively. When the light source 3 has multi-colors, good light mixing can be realized, to improve the uniformity of light output.

Technical means disclosed in the solutions of the present disclosure are not limited to the technical means disclosed in the above embodiments, but also includes technical solutions composed of any combination of the above technical features. It should be noted that, for those of ordinary skill in the art, at the premise of not departing from the principle of the present disclosure, several improvements and refinements can be made, and the improvements and refinements are also regarded as the protection scope of the present disclosure.

What is claimed is:

1. A lighting device comprising:
    a lamp main housing comprising a containing cavity, wherein a recess in communication with the containing cavity and a snap-fit structure configured to connect an optical accessory are disposed at an end of the lamp main housing, and a position of the recess corresponds to a position of the snap-fit structure;
    a heat dissipation device, wherein the heat dissipation device is disposed in the containing cavity;
    a light source, wherein the light source is in heat-conduction connection with the heat dissipation device, and is located inside of the containing cavity or the recess; and
    a front-end housing comprising a throughout hollow cavity, wherein an end of the front-end housing is disposed on the light source, and another end of the front-end housing faces an outer side of the recess and passes through the recess;
    wherein light emitted by the light source passes through the hollow cavity of the front-end housing and is emitted outward;
    wherein a reflection layer is disposed on an inner wall of the front-end housing, a light mixing member is disposed on the inner wall of the front-end housing, and the reflection layer is disposed on the light mixing member.

2. The lighting device as claimed in claim 1, wherein the lighting device further comprises an optical sheet, the optical sheet is disposed at an end of the front-end housing away from the light source, and there is a preset distance between the optical sheet and the light source.

3. The lighting device as claimed in claim 1, wherein a cross-section of the inner wall of the front-end housing is polygonal, and the reflection layer comprises a plurality of reflection planes attached to the inner wall of the front-end housing.

4. The lighting device as claimed in claim 1, wherein the reflection layer comprises any one of a frosted reflection surface, a faceted reflection surface, and a threaded reflection surface.

5. The lighting device as claimed in claim 1, wherein the reflection layer is formed integrally with the front-end housing.

6. The lighting device as claimed in claim 1, wherein the front-end housing is in heat-conduction connection with the lamp main housing, or the front-end housing is in heat conduction connection with the heat dissipation device.

7. The lighting device as claimed in claim 1, wherein an auxiliary fan is disposed on the front-end housing or the lamp main housing, and the auxiliary fan blows air to dissipate heat for the front-end housing.

8. The lighting device as claimed in claim 1, wherein an insulating base is disposed between the light source and the front-end housing, and the insulating base insulates and separates the light source from the front-end housing.

\* \* \* \* \*